United States Patent [19]

Iizuka

[11] Patent Number: 5,166,829
[45] Date of Patent: Nov. 24, 1992

[54] LENS BARREL

[75] Inventor: Toshimi Iizuka, Kanagawa, Japan

[73] Assignee: Canon Kabushiki Kaisha, Tokyo, Japan

[21] Appl. No.: 643,729

[22] Filed: Jan. 22, 1991

[30] Foreign Application Priority Data

Jan. 30, 1990 [JP] Japan .................................. 2-019741

[51] Int. Cl.[5] ............................................. G02B 15/00
[52] U.S. Cl. ..................................... 359/699; 359/823
[58] Field of Search ............... 359/694, 699, 696, 823; 354/195.1

[56] References Cited

U.S. PATENT DOCUMENTS 4,457,591  7/1984  Muryoi et al. ...................... 350/430
4,583,827  4/1986  Tokunaga et al. ................... 350/429
4,971,427  11/1990 Takamura et al. ................... 350/429

Primary Examiner—Frank Gonzalez
Attorney, Agent, or Firm—Robin, Blecker, Daley & Driscoll

[57] ABSTRACT

Disclosed is a lens barrel for conducting zooming by moving at least first and second lenses in the direction of an optical axis. The lens barrel includes a plate cam arranged to be pivoted by the movement of the first lens in the direction of the optical axis, the plate cam having at least a first cam portion for the second lens, and a moving mechanism having a first cam follower which is in contact with the first cam portion of the plate cam, the moving mechanism moving the second lens in the direction of the optical axis when the plate cam is pivoted.

12 Claims, 3 Drawing Sheets

LENS BARREL

BACKGROUND OF THE INVENTION

1. Field of the Invention

This invention relates to a having a zooming function.

2. Description of the Related Art

Conventional lens moving apparatus of the type which employs a plate cam have been proposed in British Patent No. 937,245, Japanese Utility Model Publication No. Sho 39-13162, U.S. Pat. Nos. 3,181,447 and 3,533,344, Japanese Patent Publication No. Sho 46-13110, Japanese Laid-Open Patent Application Nos. Sho 59-104613, Sho 59-192212, Sho 60-91311, Sho 59-176711, Sho 62-139510, Sho 60-216319, Sho 60-216320, Sho 60-87310, Sho 59-176712, Sho 59-192214 and Sho 59-192213.

Conventionally, a cylindrical cam tube is used for the movement of a zoom lens. However, the cylindrical cam tube requires a high dimension accuracy and a long processing time, and is therefore expensive. Accordingly, it has been proposed to make a cam a flat component and manufacture it by pressing at a low cost. Several types of plate cams are known. However, none of them has been put into practical use. Movement of a zoom lens requires movement of at least two lens groups. In consequence, in the case of a zoom lens in practical use, drive of all the lens groups by means of the plate cam increases the area of the plate cam and, hence, the size of the lens barrel. When lenses have a cylindrical configuration, the size of the lens barrel is particularly increased.

In a case where zooming is electrically operated using the plate cam, when an actuator for driving lenses, a gear train, a driving circuit and so on are disposed within the cylindrical lens barrel, the size of the lens barrel is increased.

SUMMARY OF THE INVENTION

An object of the present invention is to provide an inexpensive and small lens barrel having a zooming function.

To this end, the present invention provides in one aspect thereof a lens barrel in which a first lens is moved in the direction of an optical axis by a motor and in which a second lens is moved in the direction of the optical axis by the rotation of a plate cam which is accomplished by the movement of the first lens in the direction of the optical axis.

Other objects and features of the present invention will become more apparent from the following description of the preferred embodiments thereof, taken in conjunction with the accompanying drawings.

DETAILED DESCRIPTION OF THE PREFERRED EMBODIMENT

Figure 1:
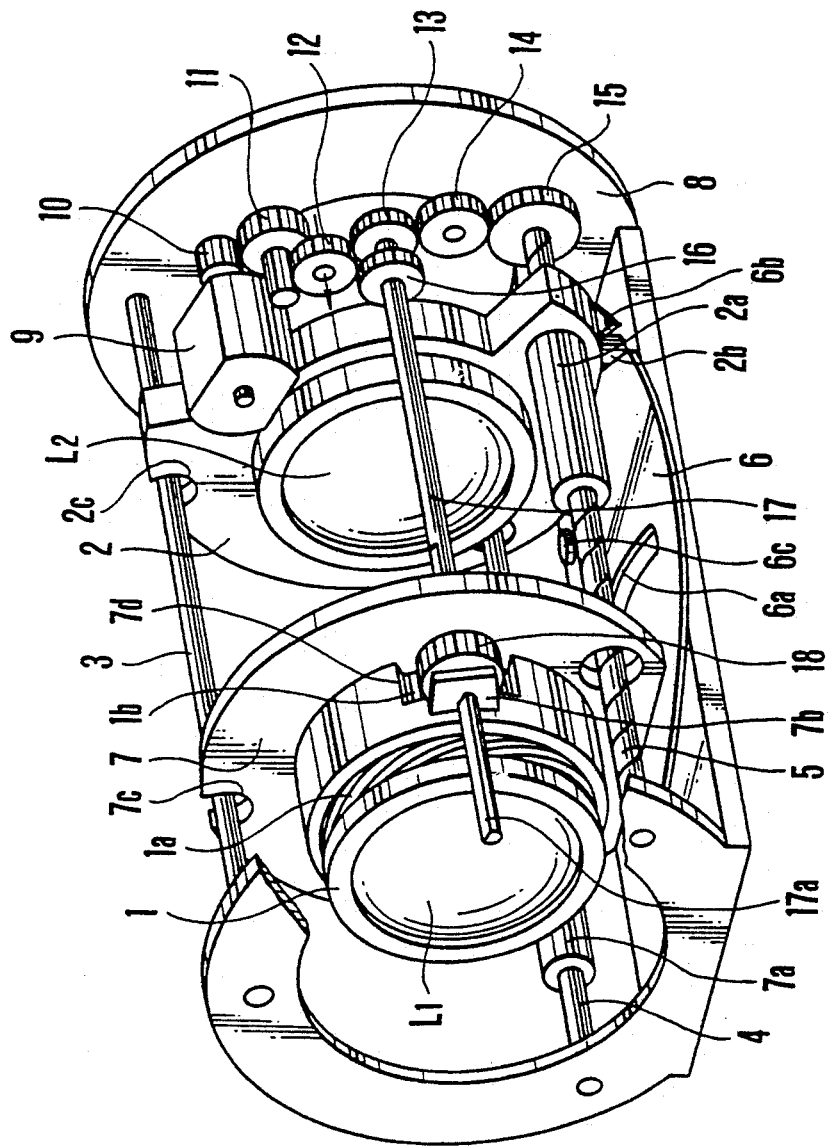
FIG. 1 is a perspective view of a first embodiment of a zoom lens barrel according to the present invention.

A first embodiment of the present invention will be described below with reference to FIGS. 1 to 4. FIG. 1 is a perspective view of the essential parts of a lens moving apparatus. In FIG. 1, a reference numeral 1 denotes a third lens holding frame; 2, a first lens holding frame; 3 and 4, guide bars which are held in parallel to an optical axis; 5, a helically threaded rod which is held in parallel to the optical axis; 6, a plate cam which is rotatable on a plane parallel to the optical axis; 7, a second lens holding frame; 8, a fixing portion for retaining the guide bars 3 and 4, a motor 9 and the plate cam 6; 9, a motor for driving a zoom lens and a focus lens; 10, 11, 12, 14, 15 and 16, gears; 17, a rotary shaft for driving the focus lens; 18, a gear for driving the focus lens; 1a, a helicoid thread formed on the outer periphery of the third lens holding frame 1 for feeding out the lens for focusing, the helicoid thread 1a being in mesh with a threaded portion (not shown) formed on the inner periphery of the second lens holding frame 7; 1b, a spur gear formed on the outer periphery of the third lens holding frame 1; 2a, a sleeve formed integrally with the first lens holding frame 2 and extending in the direction of the optical axis; 2b, a cam pin (cam follower) formed integrally with the first lens holding frame 2; 2c, a U-shaped groove for receiving the guide bar 3 and thereby guiding the movement of the holding frame 2 in the direction of the optical axis; 6a, a first cam groove formed in the plate cam 6; 6b, a second cam groove formed in the plate cam 6; 6c, a rotary shaft about which the plate cam 6 rotates on the plane which is parallel to the optical axis (having an axis which extends in the direction perpendicular to the optical axis), the rotary shaft 6c being fixedly mounted on the fixing portion 8; 7a, a sleeve which protrudes from the second lens holding frame 7 in the direction of the optical axis; 7b, a bearing portion which holds a gear 18 together with the holding frame 7 after assembly and which serves as a bearing for a shaft 17; 7c, a U-shaped groove for receiving the guide bar 3 and thereby guiding the movement of the holding frame 7 in the direction of the optical axis; 7d, a notch formed in the holding frame 7 so as to enable the gear 18 to be brought into mesh with the gear 1b; and 17a, a D-cut portion used to transmit the rotation of the shaft 17 to the gear 18.

Figure 2:
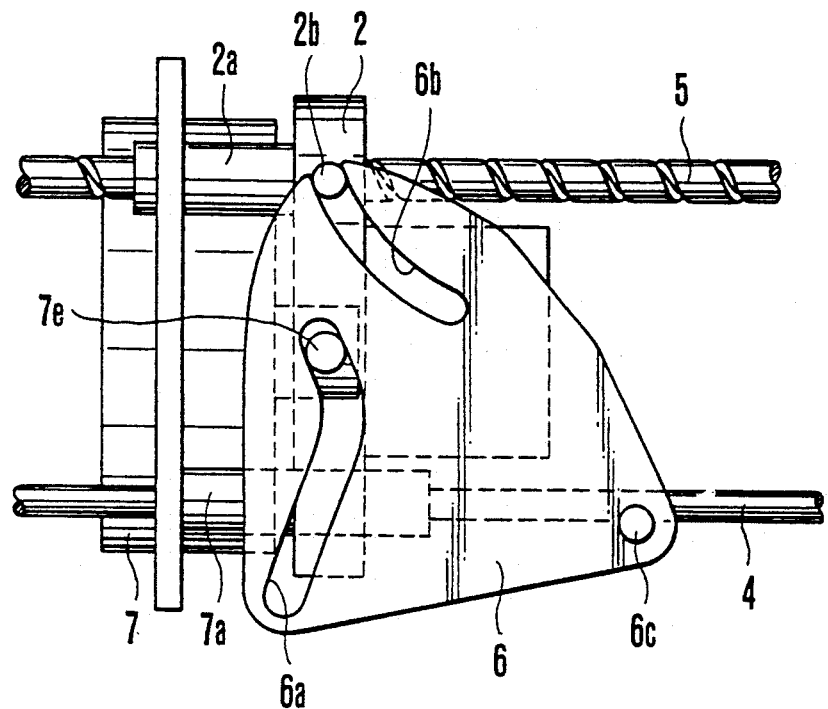
FIG. 2 shows a plate cam portion shown in FIG. 1.
Figure 3:
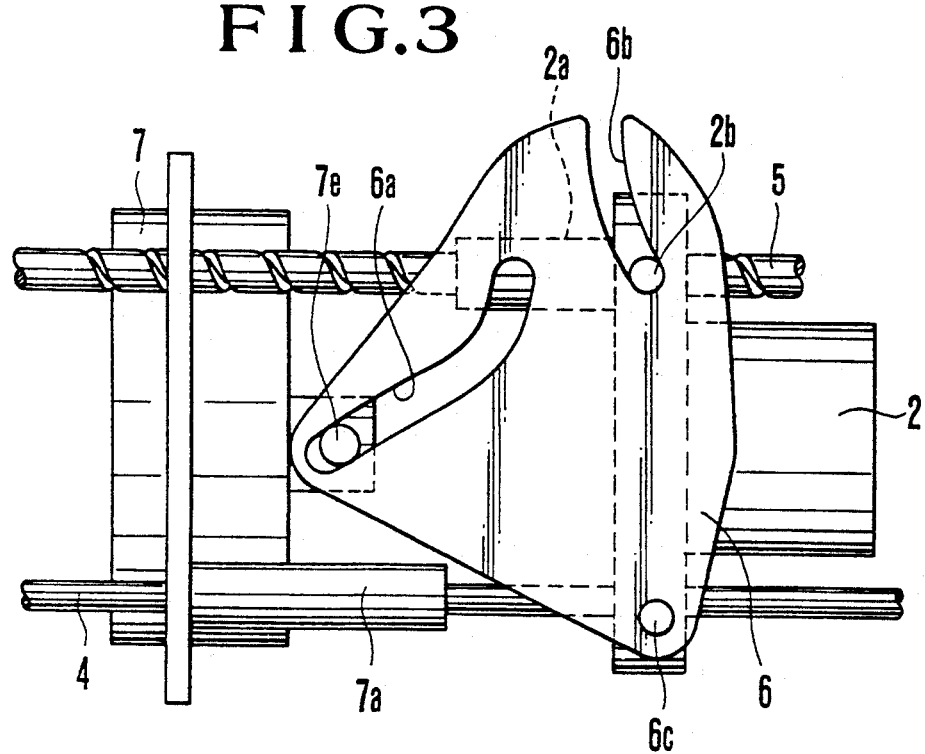
FIG. 3 shows the plate cam portion, like FIG. 2, showing a state in which the plate cam has moved from the position shown in FIG. 2.

FIGS. 2 and 3 show the vicinity of the plate cam 6 shown in FIG. 1. FIG. 2 shows the state in which the first and second movable lenses L1 and L2 (the lens L1 serves as a focus lens and a compensator during the zooming, is held by the third lens holding frame 1 and is moved also by the movement of the second lens holding frame 7, while the lens L2 serves as a variator during the zooming, and is held by the first lens holding frame 2) have been moved for zooming to the telephoto side, and FIG. 3 shows the state in which the first and second movable lenses L1 and L2 have been moved for zooming to the wide-angle side. A reference numeral 7e denotes a cam pin (cam follower) formed integrally with the second lens holding frame 7 and slidably received by the first cam groove 6a.

Figure 4:
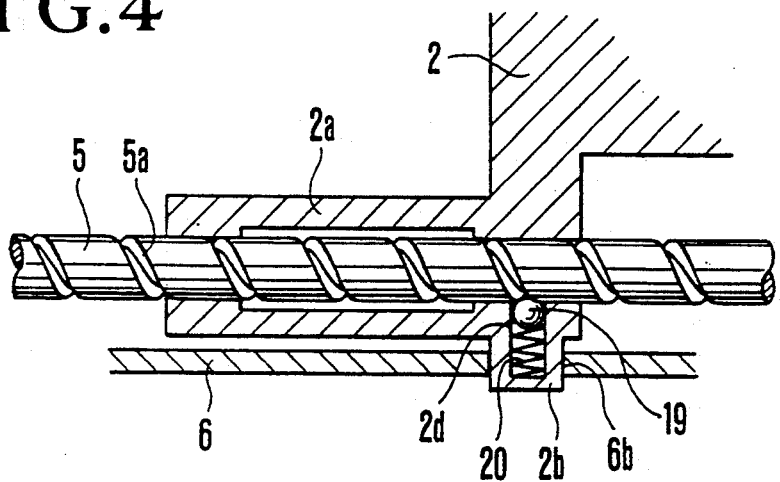
FIG. 4 shows a driving device for moving a retaining frame by the rotation of a rod.

FIG. 4 shows a driving device for moving the first lens holding frame 2 in the direction of the optical axis by the rotation of the helically threaded rod 5 shown in FIG. 1. In FIG. 4, a reference numeral 19 denotes a steel ball; 20, a coil spring; 2d, a hole formed in the cam pin 2b directed perpendicularly to the helically threaded rod 5; and 5a, a thread groove having a V-shaped form which is formed in the rod 5.

In the lens barrel arranged in the manner described above, the second lens holding frame 7 is held in such a manner as to be movable only in the direction of the optical axis by the positioning of it about the optical axis with the sleeve 7a retained by the guide bar 4 and with the U-shaped groove 7c receiving the guide bar 3. Like the second lens holding frame 7, the first lens holding frame 2 is also held in such a manner as to be movable only in the direction of the optical axis with the helically threaded rod 5 inserted into the sleeve 2a and with the U-shaped groove 2c receiving the guide bar 3. The rotation of the motor 9 is transmitted through the gears, 10, 11, 12, 13, 14 and 15 to the helically threaded rod 5 which is fixed to the gear 15 to rotate it.

As shown in FIG. 4, the steel ball 19 is pressed against the thread groove 5a formed in the helically threaded rod 5 by means of the spring 20. Consequently, when the rod 5 is rotated by the motor 9, the first movable lens holding frame 2 moves in the direction of the optical axis by the action of the thread groove 5a and the steel ball 19.

As shown in FIG. 2, the cam pin 2b formed integrally with the holding frame 2 is fitted into the second cam groove 6b of the plate cam 6 which can pivot about the rotary shaft 6c. Since the second cam groove 6b is inclined relative to the optical axis at a certain angle, when the first movable lens holding frame 2 is moved in the direction of the optical axis by the rotation of the rod 5, the plate cam 6 follows the movement of the cam pin 2b formed integrally with the holding frame 2 and is thereby rotated (pivoted).

FIG. 3 shows the state in which the plate cam 6 has been rotated at a predetermined angle from the state shown in FIG. 2 by the movement of the first movable lens holding frame 2.

Since the cam pin 7e of the holding frame 7 is inserted into the first cam groove 6a of the plate cam 6 (which is curved in a form required to move the first movable lens for zooming), when the cam plate 6 is rotated by the movement of the holding frame 2 in the direction of the optical axis, the second lens holding frame 7 is moved in the direction of the optical axis through a predetermined distance by means of the cam pin 7e inserted into the first cam groove 6a. Hence, when the motor 9 is rotated, the lens L2 which serves as a variator moves in the direction of the optical axis by the rotation of the rod 5, and the lens L1 which serves as the compensator moves in the direction of the optical axis by the pivot of the plate cam 6.

Focusing is conducted in the manner described below: the helicoid thread 1a of the third lens holding frame 1 is in mesh with the inner periphery of the second lens holding frame 7. The spur gear 1b formed on the outer periphery of the holding frame 1 is in mesh with the gear 18. Therefore, rotation of the gear 18 rotates and moves the third lens holding frame 1 for focusing through the helicoid 1a. The rotational force of the motor 9 is transmitted to the gear 16 to rotate the shaft 17 by moving the gear 12 by means of a clutch mechanism in the direction indicated by an arrow. Rotation of the shaft 17 is transmitted to the gear 18 by means of the D-cut portion 17a. The gear 18 is movable in the direction of the optical axis. Hence, when the gear 18 rotates by the rotation of the motor 9, the third lens holding frame 1 moves in the direction of the optical axis for focusing, by which the lens L1 moves in the direction of the optical axis.

Figure 5:
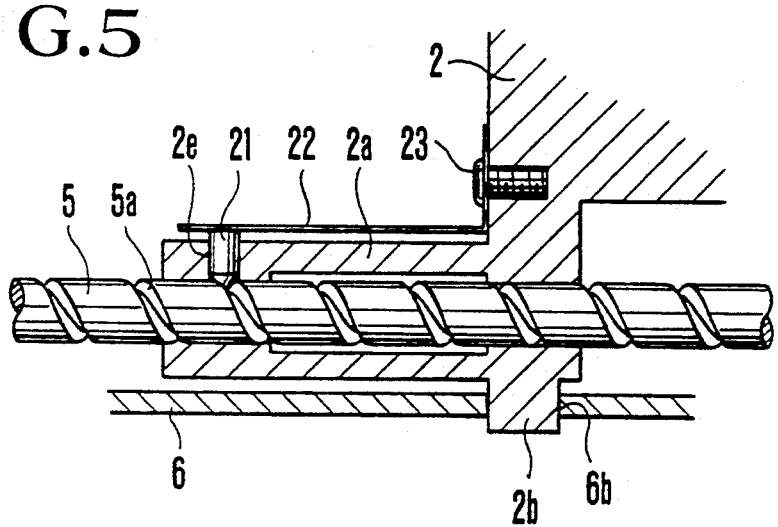
FIGS. 5 and 6 show modifications of the driving device shown in FIG. 4.
Figure 6:
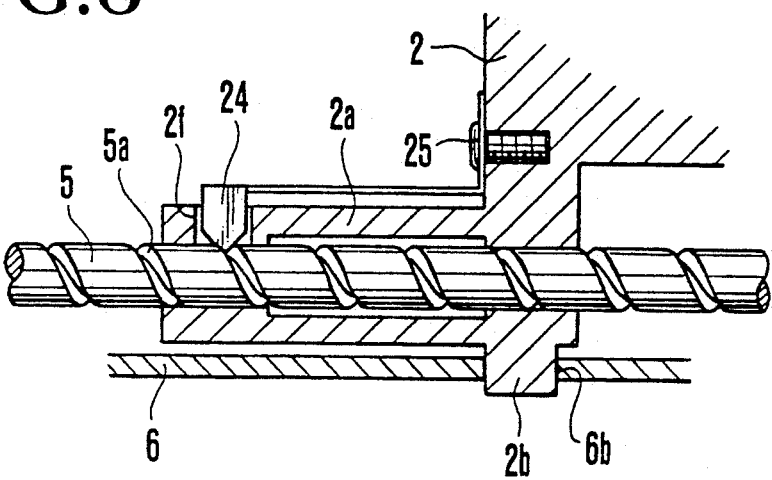

FIGS. 5 and 6 show modifications of the driving device shown in FIG. 4. In the structure shown in FIG. 5, a pin 21 having a conical distal end is pressed against the thread groove 5a of the helically threaded rod 5 by means of a plate spring 22. Since the pin 21 is tightly fitted into a hole 2e in the holding frame 2, the first lens holding frame 2 moves in the direction of the optical axis by the rotation of the rod 5.

In the configuration shown in FIG. 6, a member pressed against the thread groove in the rod 5 is formed integrally with a plate spring 24. The portion of the member which is in contact with the thread groove 5a is shaped into a V form. A reference numeral 2f denotes an escape hole.

The above-described embodiments have the following advantages:

(i) The use of a plate cam allows the production cost to be reduced when compared with the use of a conventional cylindrical cam tube.

(ii) Since the first lens holding frame 2 (variator) is held and moved for zooming by means of the helically threaded rod, a member exclusively used for holding the holding frame 2 is not necessary.

(iii) Since the first lens holding frame 2 (variator) can be moved by the rotation of the helically threaded rod, electically driven zooming is facilitated.

(iv) The reduction ratio of the rate at which the driving force of the motor is transmitted to the gears can be freely selected by adequately selecting the lead of the thread on the helically threaded rod. Since the reduction ratio can be increased by reducing the lead, the reduction gear can be simplified.

(v) In a case where the motor is accommodated within the zoom lens, provision of the motor parallel to the optical axis improves the spatial efficiency. Since the helically threaded rod rotates in parallel to the optical axis, when the power of the motor is transmitted, it can be transmitted efficiently using only a spur gear.

(vi) Since the plate cam 6 follows the movement of the first lens holding frame 2 (variator), the configuration of the cam for the second lens holding frame 7 (compensator) can be optimized, and the size of the plate cam can be reduced. In consequence, the size of the cylindrical zoom lens barrel can be reduced even when the plate cam is used.

As will be understood from the foregoing description, in the above embodiments, electrically driven zooming is simplified using the plate cam, and the size of the plate cam can be reduced. In consequence, a small cylindrical zoom lens barrel can be provided.

In the above-described embodiments, the motor is accommodated within the lens barrel. However, rotation of the motor accommodated within a camera body may be received by the lens barrel through a transmission mechanism to drive the two lenses.

In the present invention, one of the lenses may be manually moved in the direction of the optical axis with the other lens moved using a plate cam.

What is claimed is:

1. A lens barrel for conducting zooming by moving at least first and second lenses in the direction of an optical axis, comprising:
   (a) a plate cam arranged to be moved in accordance with the movement of said first lens in the direction of the optical axis, said plate cam having at least a first cam portion; and (b) a moving mechanism having a first cam follower which is in contact with said first cam portion of said plate cam, said moving mechanism moving said second lens in the direction of the optical axis in accordance with the movement of said plate cam.

2. A lens barrel according to claim 1, further comprising:

a second moving mechanism for moving said first lens in the direction of the optical axis, said second moving mechanism having a helically threaded rod which is rotated by a rotation of a driving source, and a follower which is in contact with a helical thread of said helically threaded rod, said second moving mechanism moving said first lens in the direction of the optical axis by the movement of said follower in the direction of the optical axis which is caused by the rotation of said rod.

3. A lens barrel according to claim 1, wherein said plate cam has a second cam portion in addition to said first cam portion, a second cam follower interlocked with said first lens being in contact with said second cam portion so that said plate cam is moved by the movement of said first lens in the direction of the optical axis.

4. A lens barrel according to claim 2, further comprising:

a third moving mechanism for independently moving said second lens in the direction of the optical axis.

5. A lens barrel according to claim 1, wherein said first lens serves as a variator in zooming while said second lens serves as a compensator in zooming.

6. A lens barrel according to claim 1, wherein said first lens serves as a variator in zooming while said second lens serves as a compensator in zooming and as a focus lens when said second lens is independently moved in the direction of said optical axis.

7. A lens barrel according to claim 6, further comprising:

a third moving mechanism for independently moving said second lens in the direction of the optical axis.

8. A lens barrel according to claim 1, wherein said plate cam is disposed in parallel to the optical axis.

9. A lens barrel according to claim 2, wherein said rod is rotated by the driving source which is a motor disposed within said lens barrel.

10. A lens barrel according to claim 6, further comprising:

a second moving mechanism for moving said first lens in the direction of the optical axis and thereby moving said plate cam; and a third moving mechanism for independently moving said second lens in the direction of the optical axis.

11. A lens barrel according to claim 10, further comprising:

a clutch for selectively transmitting a rotation of a driving source to one of said second moving mechanism and said third moving mechanism.

12. A lens barrel according to claim 11, wherein said driving source is a motor which is disposed within said lens barrel.

* * * * *